July 31, 1962 J. P. COSTAS 3,047,660
MEANS FOR OBTAINING CHARACTER TIME IN A RADIO COMMUNICATION SYSTEM RECEIVER
Filed Jan. 6, 1960 7 Sheets-Sheet 1

John P. Costas
INVENTOR.
BY Isidore Match
ATTORNEY

John P. Costas
*INVENTOR.*

BY Isidore Match

ATTORNEY

John P. Costas
*INVENTOR.*

BY Isidore Match

ATTORNEY

John P. Costas
*INVENTOR.*

BY Isidore Match

ATTORNEY

July 31, 1962 J. P. COSTAS 3,047,660

MEANS FOR OBTAINING CHARACTER TIME IN A RADIO COMMUNICATION SYSTEM RECEIVER

Filed Jan. 6, 1960 7 Sheets-Sheet 5

*INVENTOR*
John P. Costas

BY Isidore Match

ATTORNEY

John P. Costas
*INVENTOR.*

BY Isidore Match

ATTORNEY

John P. Costas
*INVENTOR.*

BY Isidore Match

ATTORNEY 3,047,660

MEANS FOR OBTAINING CHARACTER TIME IN A RADIO COMMUNICATION SYSTEM RECEIVER

John P. Costas, Fayetteville, N.Y., assignor to General Electric Company, a corporation of New York Filed Jan. 6, 1960, Ser. No. 858
8 Claims. (Cl. 178—88)

This invention relates to data communication systems. More particularly, it relates to a receiver for an improved radio Teletype communication system which has advantageous gain and improved bandwith requirements.

Heretofore, in radio Teletype systems, frequency shift keying has been utilized for mark-space signal transmission. In a paper by Doelz and Heald entitled "A Predicted Wave Radio Teletype System," 1954 IRE Convention Record, part 8, pp. 63–69, there is described a system which exhibits an 8 db power advantage over a frequency shift keying system. Such "Predicted Wave" system may be regarded as a frequency shift keying system with the exception that the detection technique employed therein is different from conventional techniques. Thus, the mark and space signals are transmitted by frequency shift keying, but at the receiver, a semi-coherent detection and integration technique is employed for both the mark and space channels. A pair of integrators in the receiver provide two outputs, and a comparison of these two outputs determines the mark or space decision for a given baud. In the Doelz and Heald paper, it is pointed out that by the use of such integrator output comparisons, flat fading can be accommodated without the use of limiting amplifiers.

In a paper by John P. Costas entitled, "Phase-Shift Radio Teletype," published in the Proceedings of the IRE, vol. 45, No. 1, January 15, 1957, on pp. 16–20, there is discussed, in theory, a phase shift radio Teletype system and a comparison of its theoretical operation with the "Predicted Wave" radio Teletype system disclosed in the aforementioned Doelz and Heald paper. To make such comparison, a message structure similar to that employed in the Doelz and Heald system is assumed. This message structure is re-timed by storage techniques into a 7 baud character of 156 ms. duration with equal times assigned to each baud. Such time is somewhat shorter than the shortest character time for a sixty word per minute Teletype so that the transmission system stays ahead of the Teletype at all times. The Costas paper shows, essentially through a mathematical analysis, that a phase shift radio Teletype system has a substantial power advantage over both a frequency shift keying system and a predicted wave system.

Thus, if a receiver can be provided which will accurately detect information from a received carrier wave whose frequency remains unchanged but whose phase changes from zero to 180° with a mark-space transition, a substantial gain in power and efficiency and, depending upon the shape of message pulse that is used, a reduction of bandwidth requirements is achieved.

The operational requirements of such a receiver consist in the establishment of timing pulses at the receiver which indicate the beginning of a character and also the center of each bit interval of the bits which make up a character. This timing information has to be obtained automatically and accurately even in the presence of fairly large amounts of noise or interference. Furthermore, the operation of the timing system of the receiver must not be affected by the message structure, i.e., the timing system must operate properly no matter what message is sent, whether it be all marks, all spaces, or an intermixture of each. In addition, it is highly desirable that synchronizing information be contained in the message itself rather than the including in the transmission of special synchronizing signals either at an out-of-band frequency or in quadrature phase.

It is an important object of this invention to provide means for obtaining character time automatically in a receiver in a radio Teletype system.

It is another object to provide a receiver as in the proceeding object wherein synchronizing information for obtaining character time is not required to be transmitted with the transmitted message.

Generally speaking, and, in accordance with the invention, there is provided a receiver for providing mark-space, bit time and character time information in a radio Teletype system wherein there is utilized a transmitted carrier wave whose phase is shifted by 180° during a mark-space transition. The wave is effectively a suppressed carrier amplitude modulated signal modulated by a message signal comprising bits which are positive and negative pulses, each of the bits having equal widths, a chosen number of bits comprising a single character, an interval of bit width between successive characters, one set of alternate intervals being blanks, the other alternate set of intervals containing a bit pulse of a chosen polarity.

The receiver comprises synchronous detecting means for demodulating the carrier wave and for phase locking the detected message signal with the phase of the carrier wave, the synchronous detecting means having 0° and 180° stable phase lock conditions with respect to the phase of the carrier wave. A generator is provided for producing a first signal having the frequency of the message signal pulse rate and means are included to phase lock the first signal, the latter phase locking means also having 0° and 180° stable phase lock conditions. From the phase-locked first signal, there are produced by suitable pulse generating means, first and second pulse trains, the pulses of one of the trains occurring substantially at the respective centers of the bits of the detected message signal, the pulses of the other of the trains occurring substantially at the respective points between adjacent bits of the detected message signal. First and second sampling means are included for sampling the output of the synchronous detecting means with the first and second pulse trains respectively and first and second substantially unidirectional potentials are derived which are proportional to the average magnitude of the outputs of the first and second sampling means respectively, regardless of the respective polarities of the outputs. Means are provided for comparing these first and second potentials to determine the greater thereof and first and second selecting means responsive to such determination respectively select the pulse train of the first and second pulse trains which comprises pulses occurring at the respective centers of the message signal bits whereby bit time information is provided and the output of either the first or second sampling means which comprise pulsed samples of the detected message signal taken at the respective centers of the message signal bits. Third and fourth substantially unidirectional potentials are derived which are respectively proportional to the average of the outputs of the first and second sampling means and a third selecting means selects the lesser of the third and fourth potentials. This latter selected potential together with the output of the sampling means selected by the second selecting means are applied in additive relationship in a first D.C. correction means, the output of the last named means being samples of the centers of the message bit intervals D.C. corrected for any D.C. shift in the message signal caused in the synchronous detecting means and the latter selected potential is also applied in additive relationship together with the output from the synchronous detecting means in the second D.C. correction means whereby the output of the synchronous detecting means is also corrected for any D.C. shift caused by the detecting means.

Means are provided for generating a second signal having a period equal to the sum of the periods of two characters and two bit intervals and such signal is phase-locked with the phase of the output of the second D.C. correction means. A generator is provided for producing a third pulse train having pulses occurring at the zero crossover points of the second phase locked signal, whereby the pulses comprising the third pulse train occur substantially at the respective centers of the intervals which separate successive characters. These pulses are essentially character time pulses. To insure the accurate occurrence in time of the character time pulses, they may be utilized to generate a gate, i.e. applied to a one-shot multivibrator and the output of the multivibrator may be applied together with pulse train of the first and second pulse train selected by the first selecting means to gate out a character time pulse. A fourth pulse train is provided, suitably from the third pulse train, and comprising pulses occurring at the center of those alternate intervals between characters occupied by a bit pulse and third sampling means is included to sample the output of the second D.C. correction means. A substantially fifth unidirectional potential is derived from the output of the third sampling means and polarity sensing means is provided which controls the polarity of the output of the first D.C. correction means, i.e. if the polarity of the fifth potential is the same as the polarity of the bit pulses occupying alternate intervals between characters, the polarity of the output of the first D.C. correction means is unchanged and if the polarity of the fifth potential is the opposite of that of the interval bit pulses, the polarity of the output of the first D.C. correction means is inverted. By the latter arrangement, the polarity ambiguity existing due to the two stable phase lock conditions of the synchronous detecting means is resolved and true mark-space information is provided.

The features of this invention, which are believed to be new are set forth with particularity in the appended claims. The invention itself, however, may best be understood by reference to the following description when taken in conjunction with the accompanying drawings which show an embodiment of a receiver according to the invention.

In the drawings, FIG. 1 is a functional block diagram of a phase-shift radio Teletype system;

FIGS. 2 and 3 taken together as in FIG. 4 is a block diagram of a receiver in accordance with the invention utilizable in the system of FIG. 1;

Figure 2:
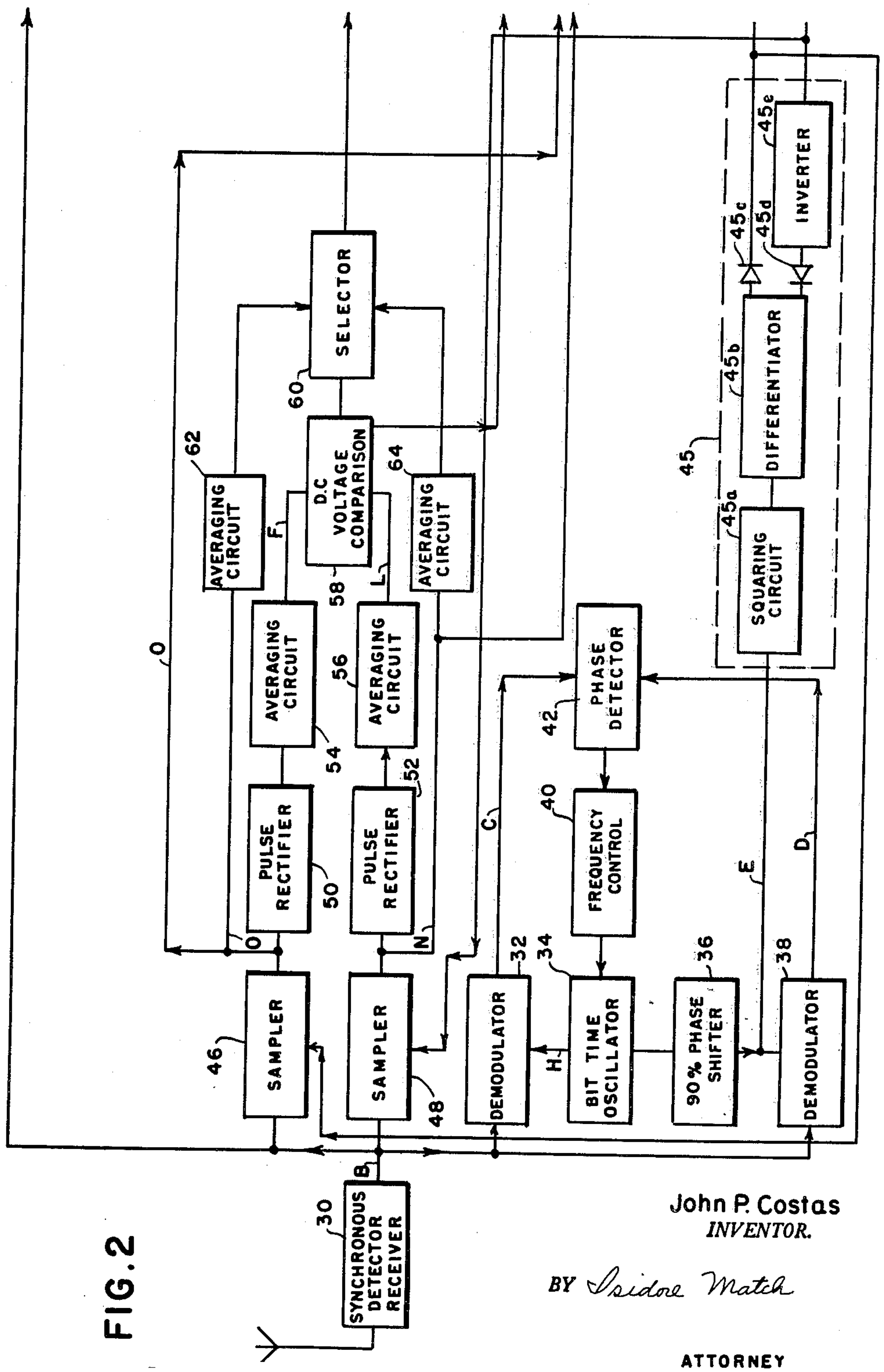
Figure 3:
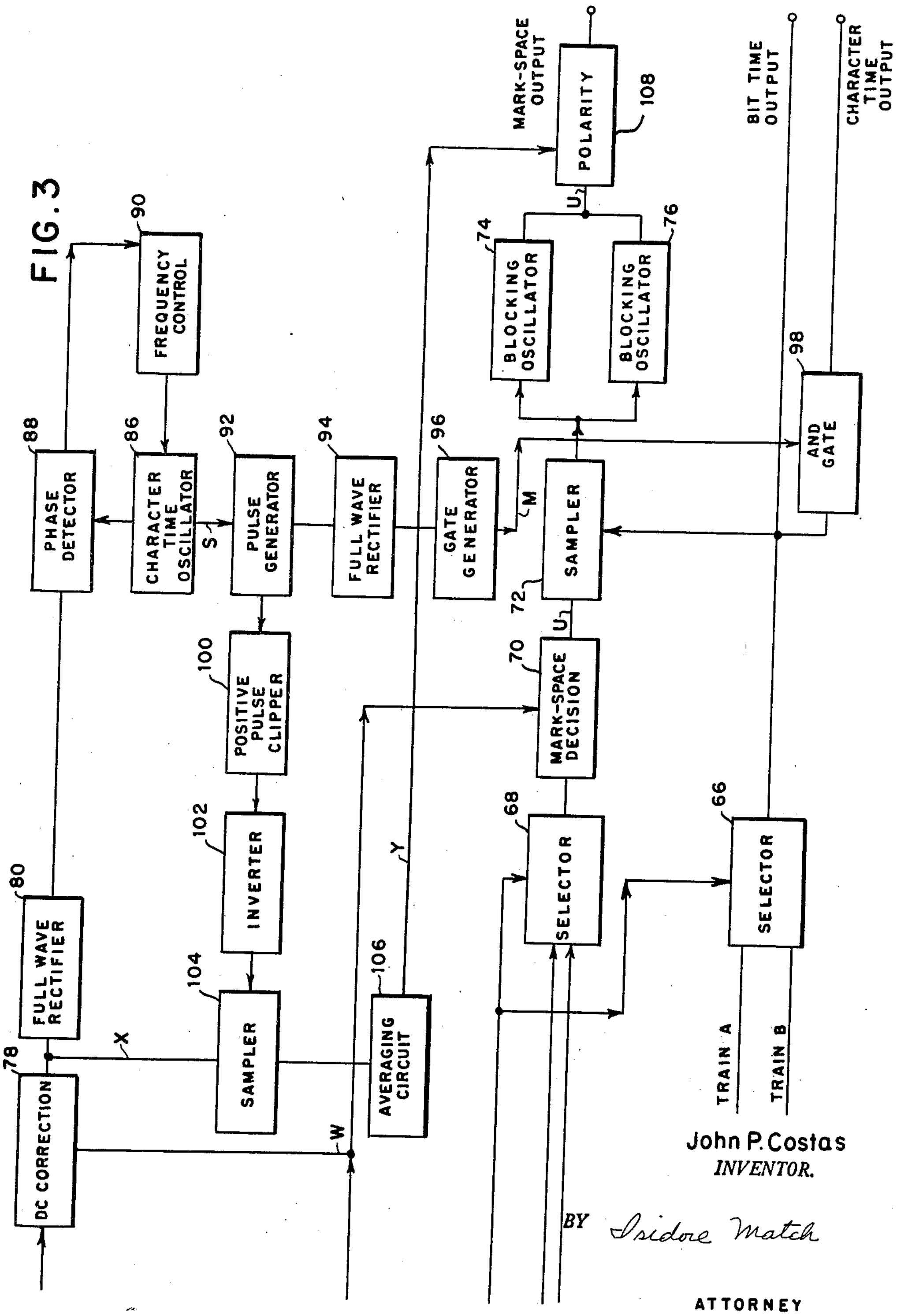
Figures 7, 8, 10:
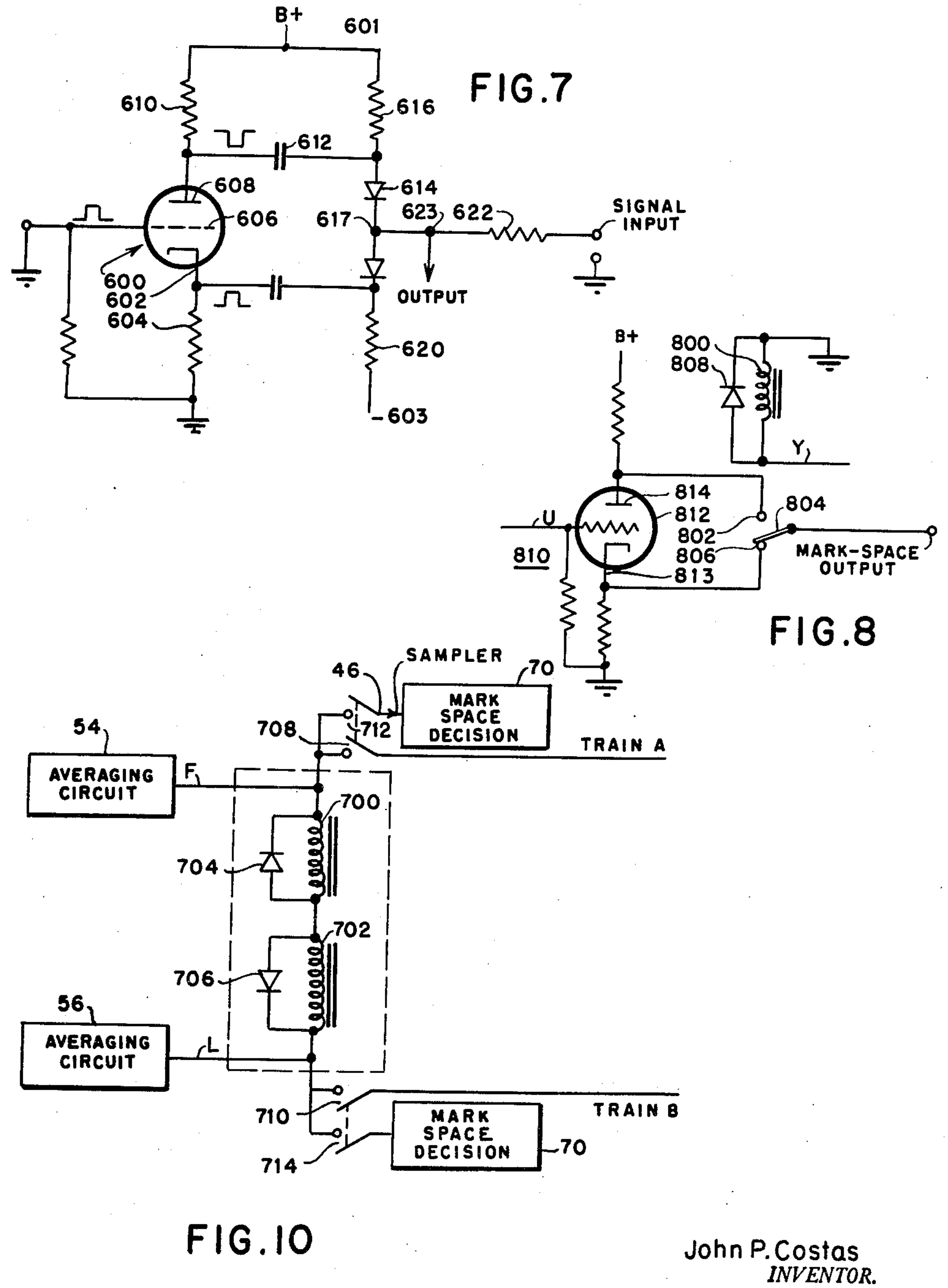
FIG. 7 is a schematic diagram of an example of a sampling circuit suitable for use in the system of FIGS. 2 and 3.
FIG. 8 is a schematic diagram of an example of a circuit suitable for providing the polarity control of the mark-space output of the system of FIGS. 2 and 3.

FIGS. 9A–9H taken together is a timing diagram of the various wave forms respectively occurring at given points in the system of FIGS. 2 and 3; and FIG. 10 is a suitable example of a D.C. voltage comparator and selecting means utilized in the system of FIGS. 2 and 3.

Figure 1:
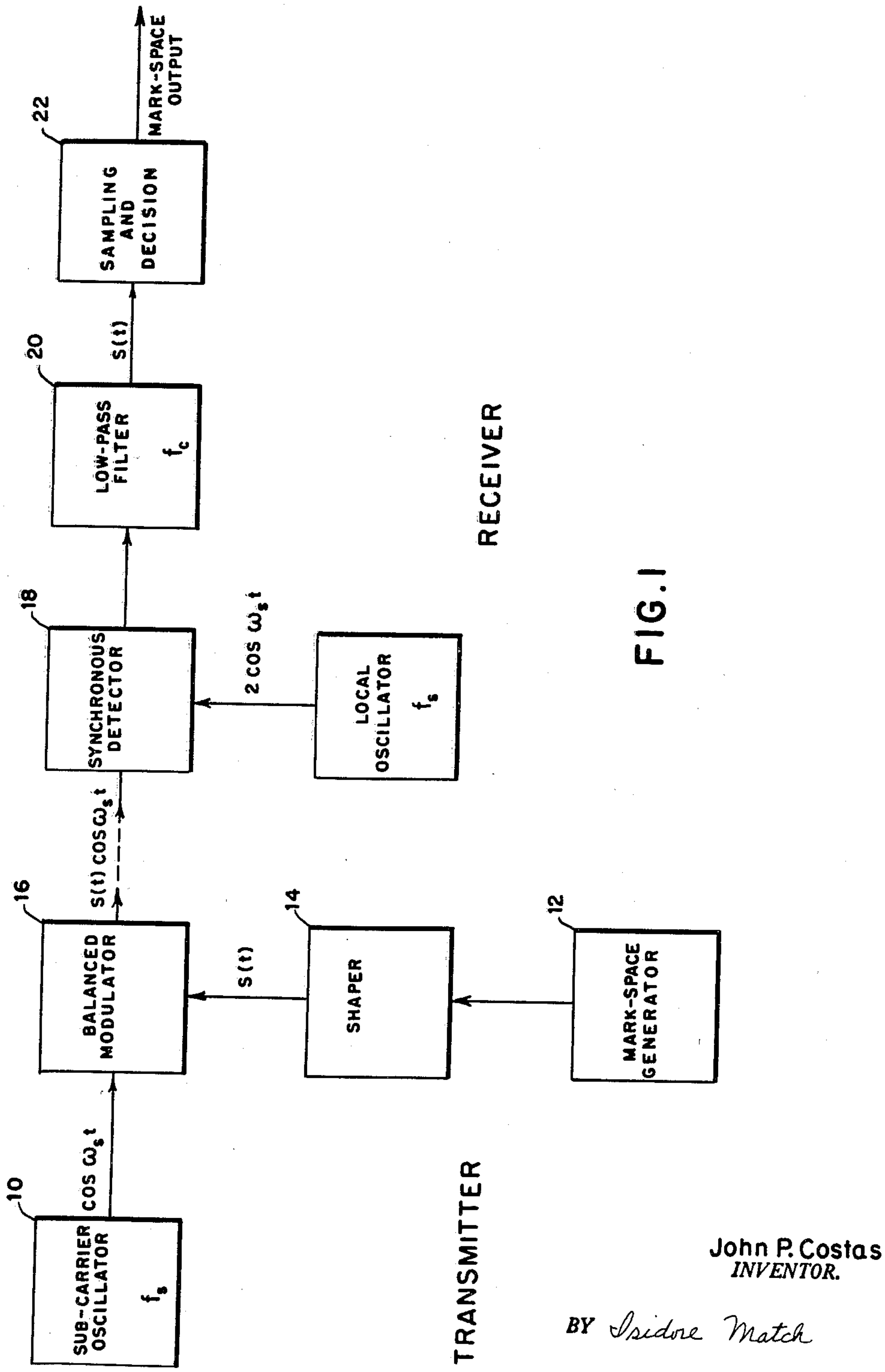

Referring now to FIG. 1, there is shown in brief functional outline, a synchronous radio Teletype system utilizing phase shift instead of frequency shift, as described in the hereinabove set forth Costas paper.

In this system, a carrier wave is transmitted whose frequency remains unchanged but whose phase changes from zero to 180° with a mark-space transition. Detection of this wave requires a coherent or phase-sensitive detector.

In the system of FIG. 1, the sub-carrier oscillator 10 having a frequency $f_s$ provides an output voltage $\cos \omega_s t$. A mark-space generator 12 together with a shaper 14 provides an output $s(t)$. If it is assumed that the output of shaper 14 is a square wave of $\pm$E volts, the output of the balanced modulator 16, i.e. the transmitted signal becomes $\pm E \cos \omega_s t$ (the + or − being determined by mark or space). It is to be noted that the use of a balanced modulator indicates that the transmiter is a double-sideband suppressed-carrier transmitter. If the synchronous detector 18 in the receiver is assumed to operate as a multiplier and if the cutoff frequency $f_c$ of the low-pass filter 20 is adjusted to pass only the frequency band occupied by the $s(t)$ square wave, the $s(t)$ wave will appear at the output of low-pass filter 20. This square wave is sampled and the appropriate mark-space decision is made in the sampling and decision stage 22. It is to be noted that with this system, pre-detection filtering is not required since receiver selectivity is determined by the low-pass post-detector filter 20. It is further to be noted that the low-pass filter output noise power is equal to the predetector noise power which falls in the frequency band $f_s - f_c$ to $f_s + f_c$. In the presence of noise, the low-pass filter output is sampled at the center of each baud interval. If this sample is positive, a mark decision is made; if the sample is negative, a space decision is made. With such arrangement, flat fading effects are substantially eliminated without the use of limiting circuits. There is, however, an increased probability of error as the signal to noise ratio worsens, but as is well kown, this is inevitable in any system.

The Costas paper explains the required band width for the system of FIG. 1. In this connection, the paper states that since the phase of a wave cannot be changed instantaneously without requiring infinite bandwidth and since instantaneous frequency and amplitude changes also require infinite bandwidth, to permit bandwidth conservation, a shaper circuit and a balanced modulator are employed in the transmitter of FIG. 1 to permit a phase transition of the transmitted signal between mark and space rather than an abrupt change. Shaper 14 converts the output of mark-space generator 12 into a pulse train $s(t)$ composed of individual pulses $p(t)$. A positive $p(t)$ pulse results for a mark and a negative $p(t)$ pulse results for a space. With this arrangement, the output of balanced modulator 16 is a wave having both amplitude variations as well as phase reversals and is a suppressed-carrier AM signal whose modulation consists of the pulse train $s(t)$. It is evident that this prevents the use of class C amplification of this type of signal, but since in the common multiplex operation of Teletype channels, class C amplification would not be possible even if the individual sub-channel signals were of a constant amplitude, phase-shifted variety, no practical advantage is lost by the shaping arrangement of FIG. 1. A bandwidth conservation per sub-channel thus can be realized which permits a closer spacing of sub-carrier frequencies in multiplex operation.

In the system of FIG. 1, if the minimum bandwidth is to be availed of, the pulse shape $p(t)$ preferably should have the form $$p(t) = E\frac{\sin \omega_c t}{\omega_c t} \qquad (1)$$

This pulse shape is the classical one which has no frequency components beyond $f_c$ and permits independent sample values to be transmitted at a rate of $2f_c$. Thus, for a given mark-space transmission rate, the pulse shape defined by Equation 1 results in the minimum bandwidth requirements for binary data transmission.

The considerations determining pulse shape and bandwidth may readily be understood by the following explanation.

If there is considered a signal voltage $S(t)$ composed of a train of pulses $p(t)$ occurring at regular intervals and if the pulses $p(t)$ appear with equal probability of being positive or negative and if each pulse is independent of all other puses, then the autocorrelation function of $S(t)$, $\phi_{SS}(\tau)$, is given by $$\phi_{ss}(\tau)=m\int_{-\infty}^{\infty}p(t)p(t+\tau)dt \qquad (2)$$

where $m$ is the pulse rate. Further, if the pulse is assumed to be of a duration $T_o$, Equation 2 may be written as $$\phi_{ss}(\tau)=m\int_{-T_o/2}^{T_o/2}p(t)p(t+\tau)dt \qquad (3)$$

where zero time represents the center of the pulse duration interval.

The power density spectrum of $S(t)$, $\Phi_{SS}(\omega)$ may be found by taking the Fourier Transform of the autocorrelation function $\phi_{SS}(\tau)$. This yields $$\Phi_{SS}(\omega)=2\pi m|P(\omega)|^2 \qquad (4)$$

where $P(\omega)$ is the Fourier Transform of $p(t)$ as given by $$P(\omega)=\frac{1}{2\pi}\int_{-\infty}^{\infty}p(t)\epsilon^{-j\omega t}dt \qquad (5)$$

Since the pulse is assumed to exist only for a time $T_o$, Equation 5 may be rewritten as $$P(\omega)=\frac{1}{2\pi}\int_{-T_o/2}^{T_o/2}p(t)\epsilon^{-j\omega t}dt \qquad (6)$$

In the interval $(-T_o/2+T_o/2)$, if the pulse is symmetric about zero time, $p(t)$ may be expressed as $$p(t)=\frac{a_o}{2}+\sum_{n=1}^{\infty}a_n\cos n\omega_o t \qquad (7)$$

where $$\omega_0=2\pi/T_o \qquad (8)$$

When Equation 7 is substituted into Equation 5, there results $$p(\omega)=\frac{T_o}{4\pi}\left\{a_o\frac{\sin\omega T_o/2}{\omega T_o/2}+\sum_{n=1}^{\infty}a_n\left[\frac{\sin(\omega T_o/2-n\pi)}{(\omega T_o/2-n\pi)}+\frac{\sin(\omega T_o/2+n\pi)}{(\omega T_o/2+n\pi)}\right]\right\} \qquad (9)$$

It is to be noted that $$P(n\omega_o)=T_oa_n/4\pi \qquad (10)$$

signifying that $$\Phi_{SS}(n\omega_o)=mT_o^2a_n^2/8\pi \qquad (11)$$

Thus of the Fourier Series expansion for $p(t)$ is limited to N terms, the power density spectrum will be zero at $\omega=(N+1)\omega_o$ and for all $n$ greater than N+1. The power spectrum will not be zero for frequencies between these points, but it can be shown that very little energy exists beyond $\omega=(N+1)\omega_o$ and that this frequency essentially specifies the bandwidth requirements for the pulse train. (There can be no absolute cutoff frequency since the train is made up of time limited pulses and a pulse which is limited in time cannot be also bandlimited in frequency).

As for pulse shaping, once the bandwidth is determined, the non-zero $a_n$'s may be chosen for pulse-shaping to meet design requirements.

Once the pulse shape is specified, the average power of $S(t)$ can be evaluated by substituting Equation 7 into Equation 2 and letting $\tau$ be zero. The result is $$Pave=\frac{mT_o}{2}\left[\frac{a_o^2}{2}+\sum_{n=1}^{\infty}a_n^2\right] \qquad (12)$$

Thus, assuming that the message structure utilized in the system of FIG. 1 is a 7 baud character of 156 ms. duration with equal times assigned to each band, then the cutoff frequency of low-pass filter 20 has to be made equal to about 22.5 cycles per second if pulses according to Equation 1 are used. From Equation 12, it can be shown that the average signal power input to the receiver synchronous detector 18 is $$Pave=E^2/2 \qquad (13)$$

If noise is present at the input to the synchronous detector, the noise power at the low-pass filter output will be equal to the total predetector noise power falling within 22.5 cycles in either side of the local oscillator frequency. In other words, using the above message structure the receiver of FIG. 1 displays an effective predetector bandwidth of 45 cycles which is twice the cutoff frequency value of the low-pass filter.

The pulse-to-pulse time overlap utilizing the pulse shape defined in Equation 1 introduces a problem which can be avoided by a deviation from the classical pulse shape defined by this equation. In the message structure as assumed, the length of the period of each baud is about 22.2 ms. If some time overlap into adjacent baud periods (say 25%) is assumed, each pulse could be permitted a duration of 1.5×22.2 ms. or 33.3 ms. This would still leave the middle 50% of each baud interval free of adjacent pulse voltages and the sampling accuracy requirements of the receiver would be reasonable. Thus, a pulse shape $p(t)$ may be chosen having the form $$p(t)=\frac{E}{2}(1+\cos\omega_o t),\ \left(-\frac{T_o}{2}<t<\frac{T_o}{2}\right) \qquad (14)$$

where $$\omega_o=\frac{2\pi}{T_o}\ T_o=0.0333\text{ sec.} \qquad (15)$$

If $T_o$ is chosen to be 33.3 ms., the pulse defined by Equation 14 has a peak value of E volts and a duration of 33.3 ms. A pulse train $S(t)$ made up of such pulses requires a base-band frequency of 60 c.p.s. and the average *rf* signal power put into the receiver synchronous detector is $$Pave=0.281E^2 \qquad (16)$$

It is seen that either using the pulse shape defined by Equation 1 or 14, a signal of E volts is produced at the output of low-pass filter 20. If noise is not considered, the utilization of the pulse shape defined by Equation 14 shows a power advantage over the utilization of the pulse shape defined by Equation 1 of 0.500/0.281 or 2.51 db. However, if noise is present, the 2.51 db advantage is lost due to the increased bandwidth requirements utilizing the pulse shape defined by Equation 14. Thus, returning to the message structure of 22.2 ms. per baud period utilizing a low-pass filter with a cutoff frequency of 60 cycles rather than one of 45 cycles, a filter output noise power increase of 120/45, i.e. 4.27 db results. This leaves 4.27−2.51 or a 1.76 db signal-to-noise ratio advantage using the pulse shape of Equation 1. However, it is seen that a practical design for pulse shape $p(t)$ to be used in the system of FIG. 1 results in a system performance which is within 2 db of the theoretical limit permitted by the use of the pulse shape defined by Equation 1.

Figure 4:
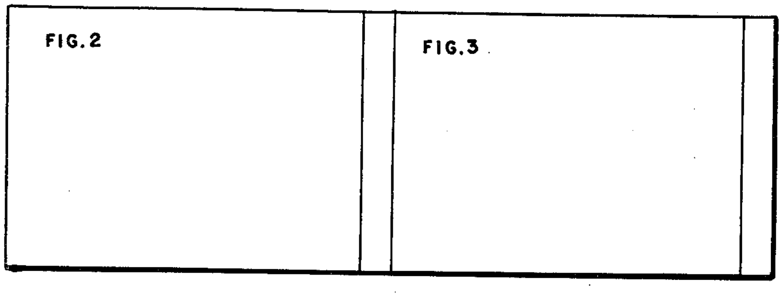
Figure 9:
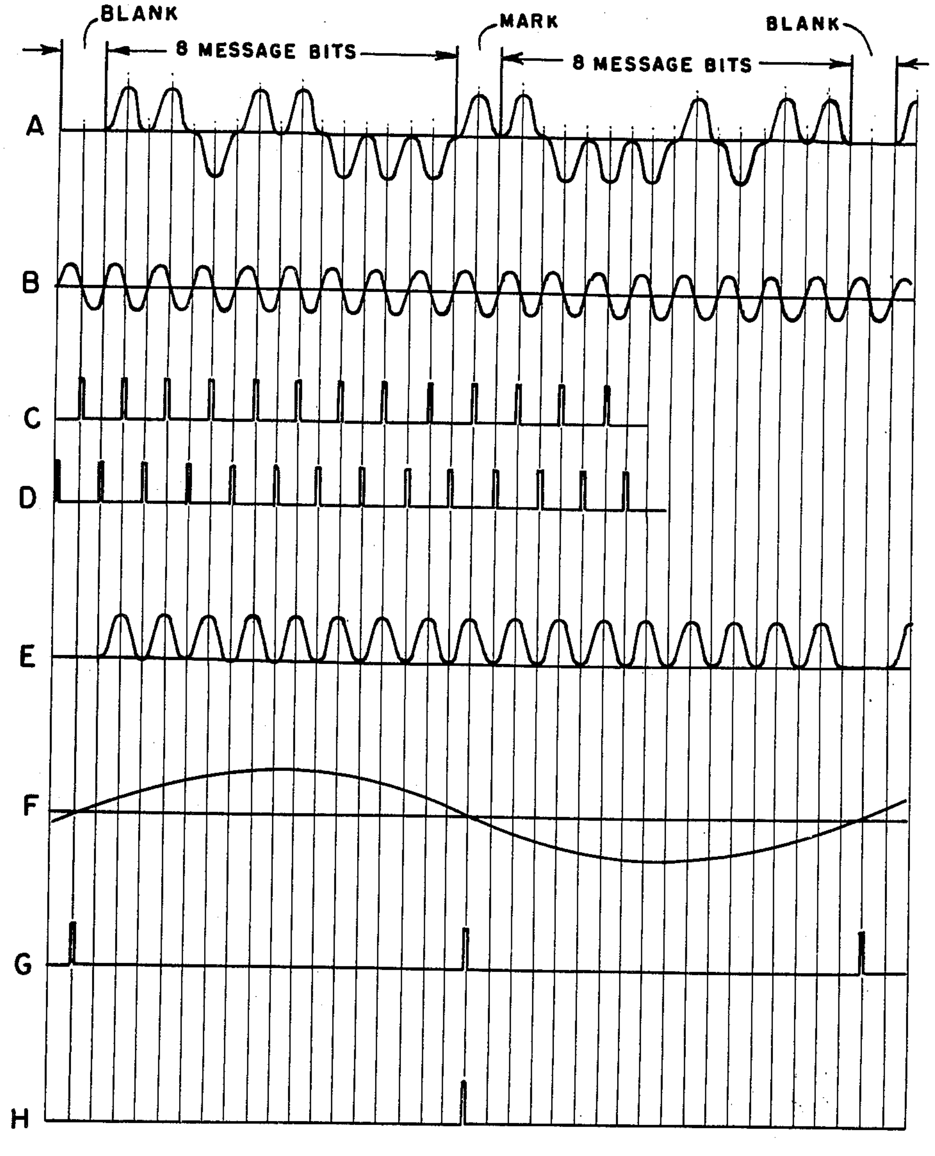

Referring now to FIGS. 2 and 3 taken together as in FIG. 4, there is shown a receiver in a synchronous radio Teletype system in accordance with the principles of the invention. The signal received is a carrier wave whose phase is shifted 180° by a mark-space transition. In the interests of bandwidth conservation, abrupt changes do not occur but instead the amplitude as well as the phase are changed for transmission of marks and spaces. When such changes are made in the carrier wave, the net result is a suppressed-carrier AM signal modulated by specially shaped positive and negative pulses. As described hereinabove, the "raised cosine" pulse shape defined by Equation 14 may be advantageously chosen to modulate a double sideband transmitter, i.e., from balanced modulator 16 of FIG. 1, although rectangular pulses may also suitably be utilized, FIG. 9A depicts such a raised cosine modulating message signal. This message signal comprises a pulse train at the baseband frequency comprising raised cosine pulses. Each character has been chosen to comprise 8 message bits but such choice obviously has been made for convenience of illustration and any number of bits per character may be chosen.

Figure 5:
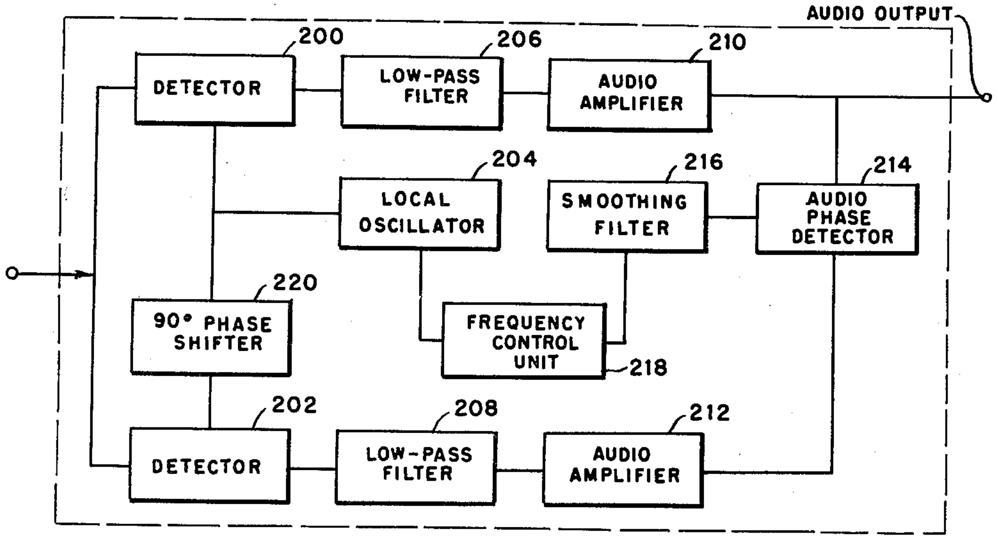
FIG. 5 is a block diagram of a synchronous detector suitable for use in the system depicted in FIGS. 2 and 3.

The modulated carrier signal is applied to a synchronous detector receiver 30. At this point it is convenient to refer to FIG. 5, which is a block diagram of a synchronous detector receiver and FIG. 6, which is a detailed schematic diagram of the block diagram of FIG. 5. The circuit of FIG. 5 is adapted for the reception and the demodulation of double-sideband signals. It comprises a pair of detectors 200 and 202. Detectors 200 and 202 are synchronous detectors for developing an output which is proportional to an arithmetic product of the signals applied to a pair of inputs thereof. For example, they may comprise a frequency converter circuit such as the type used commonly in radio receivers for converting radio frequency signals into intermediate frequency signals.

Local oscillator 204 operates to develop a signal of carrier frequency and may be a conventional radio frequency oscillator whose frequency is controlled by a reactance device which in turn is controlled by suitable unidirectional potentials applied thereto. The local oscillator may also be a phase-shift type of oscillator and the frequency control element thereof may include means for varying the phase-shift of the feedback in the oscillator thereby changing its frequency.

The output from local oscillator 204 and the double side band signal to be demodulated are applied to detector 200, at the output of which there is derived a signal corresponding to the modulating signal and a component of twice the frequency of the original carrier wave modulated by said modulating signal as will be further explained hereinbelow. The modulating signal is recovered by filtering. The output of local oscillator 204 is shifted in phase by 90° and also applied to detector 202 together with the double side band signal.

From the detector 202, there is produced an ouput having frequency components similar to the frequency components in the output of detector 200. This output includes a signal representing the modulating signal and and another signal having twice the carrier frequency modulated by the modulating signal. However, the amplitude and polarity of the modulating signal at the output of detector 202 may be different from the amplitude and polarity of the modulating signal at the output of detector 200 by a factor which is a function of the magnitude and direction of departure of the phase of the locally generated signal from local oscillator 204 with respect to the carrier wave as it would have been received had it been transmitted.

The outputs of detectors 200 and 202 are applied respectively to low-pass filters 206 and 208. These filters remove the components from the respective detector outputs having twice the carrier frequency and signals having the modulating frequency appear at the respective outputs thereof. These modulating signals are amplified respectively by audio amplifiers 210 and 212, the outputs of amplifiers 210 and 212 being applied to an audio phase detector 214.

Audio phase detector 214 may be any of a variety of detectors for deriving a signal having one polarity when the signals applied thereto are in phase and another polarity when the signals applied thereto are out of phase with respect to each other, the amplitude of the derived signal depending upon the relative magnitudes of the two input signals. Thus, at the output of audio phase detector 214, there is obtained a voltage whose polarity and magnitude vary in accordance with the direction and magnitude of departure of the phase of the signal from local oscillator 204 with respect to the phase of the carrier wave (if it were present) of the transmitted double side band signal.

The smoothing filter 216 separates the unidirectional current component from the alternating current components of the output of phase detector 214. The output from smoothing filter 216 is applied to a frequency control unit 218 which functions to control the frequency of the local oscillator to maintain the output thereof in phase with the carrier wave. Thus, it is seen that with the arrangement of FIG. 5, not only is the modulating voltage recovered at the output of audio amplifier 210 but the channel of audio amplifier 210 is also utilized in conjunction with the channel of audio amplifier 212 to maintain local oscillator 204 in synchronism with the carrier wave to obtain the desired modulating signal without need for any transmitted carrier.

The operation of the system of FIG. 5 is readily understood by considering an example. Let it be assumed that the double side band suppressed carrier amplitude modulated signal is represented by the equation $$V_1 = f_m(t) \cos \omega_0 t \tag{17}$$

Let it further be assumed that the output of the local oscillator 204 is represented by the equation $$V_2 = \cos (\omega_0 t + \delta) \tag{18}$$

where $\delta$ is the phase error between the local oscillator signal and the carrier signal. In Equation 17, $f_m(t)$ represents the modulating signal which is assumed to have a zero mean value. Since detectors 200 and 202 develop an output proportional to the product of the inputs thereto, the voltage at the output of detector 200 may be represented by the equation $$V_3 = \frac{f_m(t)}{2}[\cos \delta + \cos (2\omega_0 t + \delta)] \tag{19}$$

Similarly, since the local oscillator input to detector 202 from local oscillator 204 is shifted 90° in phase with respect to the corresponding input to detector 200 such shifted input may be represented by the following equation $$V_4 = \sin (\omega_0 t + \delta) \tag{20}$$

so that at the output of detector 202, there is obtained a voltage $V_5$ represented by the following equation $$V_5 = \frac{f_m(t)}{2}[\sin \delta + \sin (2\omega_0 t + \delta)] \tag{21}$$

Since the double frequency components $\cos (2\omega_0 t + \delta)$ and $\sin (2\omega_0 t + \delta)$ of Equations 19 and 21 will not be passed by filters 206 and 208, at the outputs of these filters there is obtained respectively voltages $V_6$ and $V_7$ represented by the following equations $$V_6 = \frac{f_m(t) \cos \delta}{2} \tag{22}$$

$$V_7 = \frac{f_m(t) \sin \delta}{2} \tag{23}$$

If $\delta$ is zero, voltage $V_7$ will also be zero. Thus, the voltage $V_7$ is indicative of the phase error. The error sense, i.e. whether $\delta$ is positive or negative may be determined at once by comparing the relative polarities of $V_6$ and $V_7$.

One way in which the information in Equations 22 and 23 can be used for phase control of local oscillator 204 is by means of audio phase detector 214, which develops a unidirectional current component of voltage having a polarity and magnitude corresponding to the direction of phase error and magnitude thereof respectively in addition to alternating current components of voltage. The unidirectional current component of voltage is obtained at the output of smoothing filter 216 which removes the aforementioned alternating current components. Thus, the voltage applied to the frequency control unit 218 is a voltage which is zero if no phase error exists and which changes polarity when the phase error changes sign. Accordingly, in the manner described, a stable feedback control is had of the phase of the output of local oscillator 204.

In the circuit of FIG. 5, described in the preceding paragraphs, a synchronous type detection is utilized for deriving the in-phase and quadrature phase audio frequency modulating components. The in-phase audio frequency component is that component obtained at the output of detector 200 and the quadrature component is the component of audio frequency voltage obtained from the output of detector 202.

Detectors 200 and 202 and phase shifter 220 together effectively represent a functional element of the embodiment of FIG. 5 which has one input to which the double side band signal is applied and another input to which a locally generated wave of carrier frequency is applied. From the output of this functional element, there are obtained at one output an in-phase audio frequency modulating voltage and from its other output, there is obtained a quadrature phase audio frequency modulating voltage.

Figure 6:
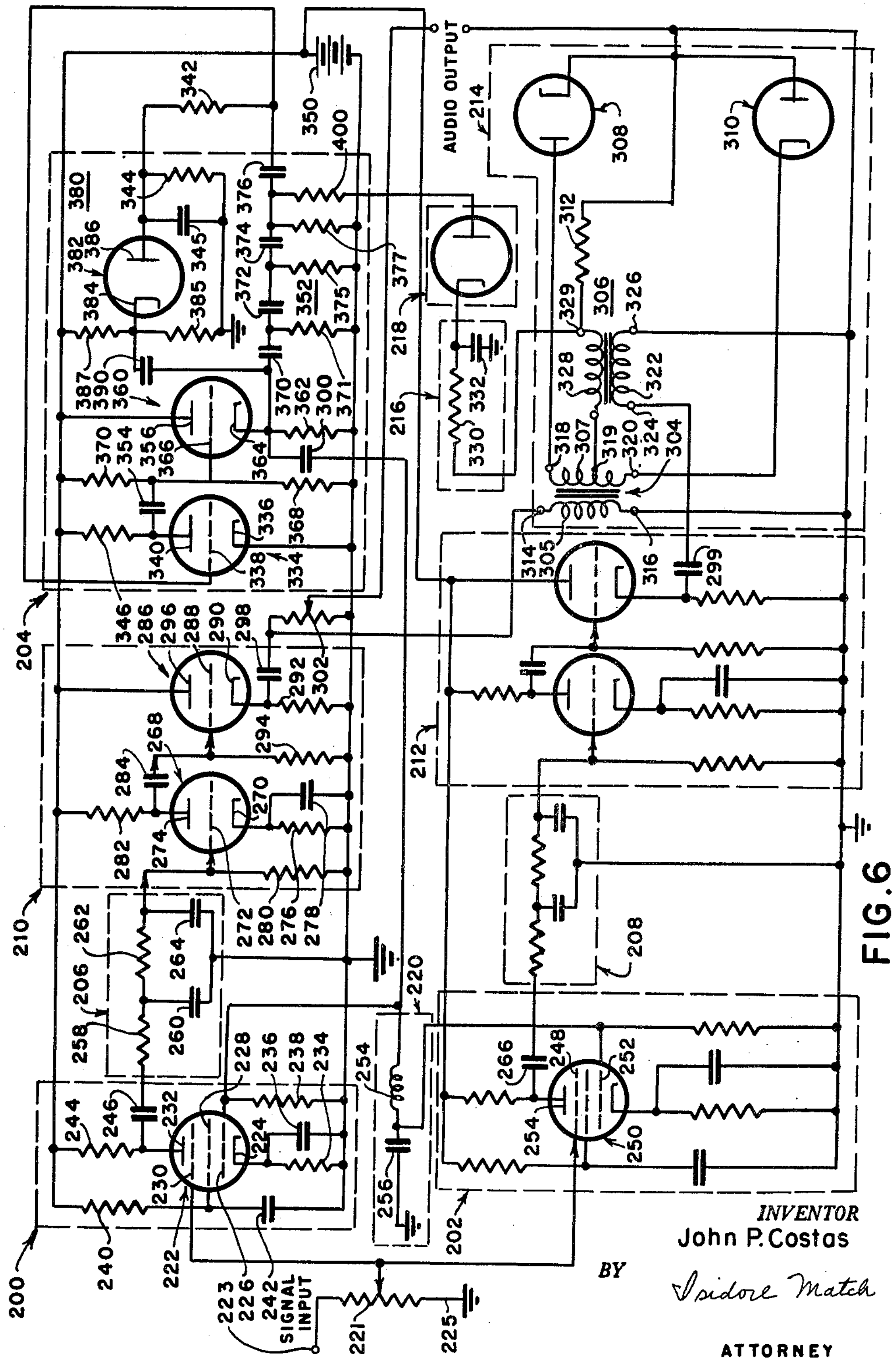
FIG. 6 is a schematic drawing of the detector of FIG.5.

Referring now to FIG. 6, there is shown one schematic representation of the embodiment shown in block diagram form in FIG. 5. The stages of FIG. 6 generally corresponding to the blocks in FIG. 5 enclosed in dashed lines and are denoted by the same numeral.

In FIG. 6, detector 200 comprises an electron discharge device 222 having a cathode 224, a control grid 226, a screen grid 228, a suppressor grid 230 and an anode 232. Cathode 224 is connected to ground through a resistor 234 bypassed by a capacitor 236. Grid 226 is connected to ground through a resistor 238 and also to the output of local oscillator 204 through a coupling capacitor 300. Screen grid 228 is connected through screen load resistor 240 to the positive terminal of unidirectional potential source 350, the negative terminal of source 350 being connected to ground. Screen grid 228 is also bypassed to ground through a capacitor 242. Anode 232 is connected through a resistor 244 to the positive terminal of source 350. Suppressor grid 230 is connected to a tap on a variable resistor 221 which in turn is connected between terminals 223 and 225, terminal 225 being connected to ground. The double side band signal is applied between terminals 223 and 225. Thus, at the output of detector 200, i.e., at anode 232, there is obtained an output which is the mathematical product of the double side band signal and the local oscillator output. Detector 202 is identical in structure and circuit arrangement with detector 200. The double side band signal to be demodulated is applied to suppressor grid 248 of an electron discharge device 250 and the signal from local oscillator 204, shifted in phase by 90°, is applied to control grid 252. Thus, at the anode 254 of device 250, there is obtained a heterodyned output.

The output from local oscillator 204 is coupled through capacitor 300 to phase shifter 220 which comprises an inductor 254 and a capacitor 256 connected in series across the output of local oscillator 204. The inductor and capacitor are chosen to have values which provide a resonant circuit at the frequency of local oscillator 204. Accordingly, the voltage obtained across capacitor 300 is shifted in phase by 90° with respect to the voltage across the resonant circuit comprising inductor 254 and capacitor 256.

Low pass filters 206 and 208 are identical. Filter 206 includes a resistor 258 and a capacitor 260 in series arrangement and connected between the anode 232 and ground and also includes a resistor 262 and a capacitor 264 in series arrangement and connected across capacitor 260. Coupling capacitor 246 isolates the unidirectional output of anode 232 from filter 206. Capacitor 266 operates in a similar manner with respect to anode 254 and filter 208. The output from filter 206 is developed across capacitor 264, capacitors 260 and 264 being chosen to have high impedances at the modulating frequencies and low impedances at the carrier frequency and multiples thereof, thereby preventing the latter from being applied to the input of audio amplifier 210. Filters 206 and 208 may also be chosen to have characteristics such that selected portions of the modulating band of frequencies in which interference signals appear may be eliminated.

Audio amplifiers 210 and 212 are identical in circuit arrangement. Audio amplifier 210 comprises an electron discharge device 268 having a cathode 270, a control grid 272 and an anode 274. Cathode 270 is connected through a cathode resistor 276 bypassed by a capacitor 278 to ground. Control grid 272 is connected through resistor 280 to ground and also to the ungrounded side of capacitor 264. Anode 274 is connected through a resistor 282 to the positive terminal of source 350 and is also connected through a coupling capacitor 284 to the control grid 288 of an electron discharge device 286 connected as a cathode follower. The cathode 290 of device 286 is connected through a resistor 292 to ground. Grid 288 is connected to ground through a resistor 294, and the anode 296 is directly connected to the positive terminal of source 350. The output appearing at cathode 290 is coupled through a coupling capacitor 298 and developed across a variable resistor 302 connected in shunt with resistor 292. The audio output is obtained between a tap on variable resistor 302, and ground. The outputs from audio amplifiers 210 and 212 are applied to the audio phase detector 214.

Audio phase detector 214 operates to develop a unidirectional voltage, the polarity and magnitude of which is dependent upon the relative polarity of the two voltages applied thereto and also upon their relative magnitudes. In other words, if one of the voltages applied to phase detector 214 is not in phase with the other voltage applied thereto, a voltage of one polarity is developed while if both voltages are in phase, a unidirectional voltage of opposite polarity is developed, the greater the amplitude of the smaller of the voltages applied thereto, the greater being the magnitude of the unidirectional voltage.

Audio phase detector 214 comprises a transformer 304, a transformer 306, a diode 308, a diode 310 and a resistor 312. Transformer 304 has a primary winding 305 connected between terminals 318 and 320, a center tap 319 being provided on secondary winding 307. Transformer 306 has a primary winding 322 connected between terminals 324 and 326 and a secondary winding 328 connected between center tap 319 and terminal 329. Terminal 318 is connected to the anode of diode 308 and terminal 320 is connected to the cathode of diode 310. One end of resistor 312 is connected to terminal 329 and its other end is connected to the junction of the cathode of diode 308 and the anode of diode 310. Terminals 316 and 326 are connected to ground and terminals 314 and 324 are connected through coupling capacitors 298 and 299 to the outputs of audio amplifiers 210 and 212 respectively.

The operation of audio phase detector 214 may best be understood by considering several examples. Let it be assumed that a voltage is applied between terminals 314 and 316 and that no voltage is applied between terminals 324 and 326. Let it be further assumed that the phase of the voltage at terminal 314 with respect to terminal 316 is the same as the phase of the voltage at terminal 318 with respect to terminal 320. Accordingly, on positive half cycles, diodes 308 and 310 will both conduct while on negative half cycles, they will be non-conductive. Thus, the voltage appearing at that end of resistor 312 connected to diodes 308 and 310 will be intermediate in value to the voltage appearing between terminals 318 and 320 and the voltage at the other end of resistor 312, i.e., the voltage at terminal 329 will also be intermediate in value to the voltage between terminals 318 and 320. Consequently, no current will flow through resistor 312 and the voltage at terminal 329 will be zero with respect to ground.

Now, let it be assumed that a voltage is applied between terminals 324 and 326 which is in phase with a voltage between terminals 314 and 316. Let it be further assumed that the potential existing at center tap 319 with respect to terminal 329 also is in phase with one voltage existing at terminal 318 with respect to terminal 320. Let it also be assumed that the magnitude of the voltage between terminals 319 and 329 is less than the voltage between terminals 318 and 320. Accordingly, the alternating current voltage appearing between terminals 318 and 329 is the sum of the in-phase voltages existing between terminals 318 and 319 and terminals 319 and 329. The voltage between terminals 320 and 329 is the sum of the voltages existing between terminals 319 and 320, and between termbinals 319 and 329. Since the voltage at terminal 320 with respect to terminal 319 is out-of-phase with respect to the voltage existing between terminals 319 and 329, the amplitude of the resultant alternating current voltage appearing between terminals 320 and 329 is less than the amplitude of the resultant voltage appearing between terminals 318 and 329. Since diode 308 conducts on positive half cycles and diode 310 conducts on negative half cycles these diodes will conduct simultaneously in this situation with current flowing in opposite directions through resistor 312. Since the amplitude of the voltage between the terminals 318 and 329 is greater than the amplitude of the voltage between the terminals 320 and 329, half cycles of voltage will appear across resistor 312 with the terminal of resistor 312 connected to the ground being positive with respect to the other terminal 329. From the foregoing explanation, it is also apparent that the larger the voltage applied to the primary winding 322 of transformer 306, the greater will be the amplitude of these positive half cycles of voltage.

Similarly, it is apparent that when the voltage applied to the primary winding 322 is of the opposite phase with respect to the voltage applied to primary winding 305, half cycles of voltage appear across resistor 312 which are of the opposite polarity, i.e., the grounded terminal of resistor 312 becomes negative with respect to its other terminal and likewise, the greater the amplitude of the alternating voltage applied to primary winding 322, the greater is the amplitude of these negative half cycles.

The unidirectional component of the voltage appearing across resistor 312 is filtered by the smoothing filter 216 which comprises a resistor 330 and a capacitor 332 connected in series with resistor 312. Thus, across capacitor 332, there is developed a unidirectional voltage whose polarity and magnitude is a function of the relative phase of the two alternating voltages applied to the audio phase detector and whose amplitude is a function of the relative magnitudes of these two voltages. This unidirectional voltage is used to vary the phase of the local oscillator 204 as will be explained hereinbelow.

Local oscillator 204 comprises an electron discharge device 334 which operates as an amplifier, an electron discharge device 360 which is connected to operate as a cathode follower buffer stage, a phase shift network 352 and an amplitude control circuit 380. Electron discharge device 334 comprises a cathode 336, a control grid 338 and an anode 340, cathode 336 being connected to ground, grid 338 being connected to ground through a resistor 342 and diode load resistor 344, anode 340 being connected through a resistor 346 to the positive terminal of source 350. Electron discharge device 360 comprises a cathode 364 connected to ground through a resistor 362, a control grid 366 connected to ground through a resistor 368, through a resistor 370 to the positive terminal of source 350 and through a coupling capacitor 354 to anode 340. Anode 356 is directly connected to the positive terminal of source 350.

The phase shift network 352 comprises capacitors 370, 372, 374, and 376, connected in series between the cathode 364 and grid 338. Resistors 371, 375 and 377 are connected respectively between the successive common terminals of the capacitors of the phase shift network 352 and ground. The amplitude control circuit 380 comprises a diode 382 having a cathode 384 connected to the junction of resistor 385 and 387 which are connected in series arrangement between the positive terminal of source 350 and ground and an anode 386 connected through resistor 344 bypassed by a capacitor 345 to ground. Cathode 364 is also connected to cathode 384 of diode 382 through a capacitor 390. The phase shift through phase shift network 352 and through amplifier device 334 is equal to a complete cycle at a given frequency of oscillation of oscillator 204 as determined by the values of the capacitors and resistors in the phase shift network. It is to be noted that the phase shift network advances the phase of the voltage appearing at its output with respect to the voltage appearing at its input. It should also be noted that the gain of the circuit from the output developed across resistor 362 through phase shift network 352, through amplifier 334 and back to device 360 is such as to be more than adequate to account for any circuit losses in the loop. Consequently, osciliation will occur at a frequency determined by the time constants of phase shift network 352. Such frequency of oscillation can be varied. By increasing the circuit losses in this network, the phase of the wave at the output thereof can be advanced with respect to the phase at its input. Similarly, if the losses are reduced, the phase at the output can be retarded with respect to the phase at the input.

Frequency control 218 operates to increase or reduce the losses in the phase shift network and thus, correspondingly advance or retard the output phase thereof. It comprises a unilateral conducting device having an anode connected to the junction of capacitors 374 and 376 through a current limiting resistor 400 and a cathode connected to the ungrounded side of capacitor 332 of the smoothing filter 216. When the voltage at the cathode of device 218 is at ground potential, the device conducts on positive half cycles thereby introducing a given amount of power loss into the phase shift network. Conversely, when such cathode voltage is negative with respect to ground, the device of 218 conducts for a period of time greater than a half cycle thereby introducing even greater losses and similarly when the potential at the cathode is positive with respect to ground, device 218 conducts for a period of time less than one half cycle, thereby introducing smaller circuit losses into the phase shift network. Consequently, the potential at the cathode of device 218 controls phase shift network 352 and thereby controls the frequency at the output of oscillator 204 which in turn controls the phase at the output of the oscillator.

The amplitude of the output of oscillator 204 is controlled by amplitude control network 380. If the amplitude of the voltage appearing at the output of cathode follower 360 is greater than the magnitude of the bias voltage across resistor 385, diode 382 conducts with the consequent developing of a unidirectional potential across resistor 344, the end of resistor 344 connected to anode 386 being negative with respect to ground. The greater the amplitude of the voltage appearing across resistor 362, the greater is the negative voltage appearing across resistor 344. Since anode 386 is connected through resistor 342 to grid 338 of amplifier 334, the latter is biased negatively as the output from cathode follower 360 increases, thereby reducing the gain of amplifier 334 and maintaining the output voltage appearing across resistor 362 substantially constant.

Rererring back now to FIG. 2, it has been shown by the above explanation that the RF signal and the oscillator therein locks to the carrier frequency and produces at its output, the message wave form of FIG. 9A. The synchronous detection technique makes it highly desirable to demodulate at a low level and the demodulated signal is then raised in level through the use of audio amplifiers. As a result, it is to be expected that the demodulated signal appearing at the output of synchronous detector receiver 30 will not have proper D.C. restoration since the audio interstage coupling networks as shown in the description of the circuits of FIGS. 5 and 6 will not be able to preserve the D.C. component of the demodulated signal. The significance of this fact is that the signal produced at the output of synchronous detector receiver 30 may have a sizable D.C. error associated therewith depending upon the relative percentage of marks and spaces which have been transmitted. It is readily appreciated that if all marks or all spaces were received for a considerable previous time, a sizable D.C. error would exist. This D.C. shift must be determined with substantially fair accuracy if proper mark space decisions are to be made. A second problem which arises at this point is the possibility of a polarity error in the signal output from the synchronous detector receiver since the phase control scheme used therein as shown in FIGS. 5 and 6 has two stable lock conditions with respect to the incoming signal carrier phase, zero degrees and 180°. Thus, the signal as produced at the output of synchronous detector receiver 30, will either be properly polarized or will contain reverse polarization with equal probability. Accordingly, information must now be extracted from the output of receiver 30 to indicate whether the polarity of the received message is correct or whether the polarity is reversed.

The first step to be taken involves the generation of a wave whose frequency is exactly equal to the frequency of the raised cosine wave which forms the individual message pulses as depicted in FIG. 9A. Such first step is accomplished by the stages designated by the numerals 32, 34, 36, 38, 40 and 42. Inspection of the arrangement of these stages shows that it comprises a system substantially the same as the synchronous detector receiver depicted in FIGS. 5 and 6.

Considering now these stages, demodulators 32 and 38 may comprise arrangements similar to detectors 200 and 202 of the system of FIGS. 5 and 6. The phase detector 42 corresponds to phase detector 214 and functions in the same manner. Likewise, frequency control 40 is similar to frequency control 218. The bit time oscillator 34 may be a cosine wave generator with an output frequency equal to the frequency of the detected message of FIG. 9A. It is seen that the output of bit time oscillator 34 is applied to demodulator 32 and through a 90° phase shifter 36 to demodulator 38 similar to the application of the output of local oscillator 204 to detectors 200 and 202 in the system depicted in FIGS. 5 and 6. With this arrangement, the output of synchronous detector receiver 30 is demodulated by two quadrature voltages at the frequency of bit time oscillator 34 and bit time oscillator 34 is phase-locked by phase detector 42 and frequency control 40. Such phase locking may be understood in conjunction with the following analysis.

The voltage which appears at the output of synchronous detector receiver 30, that is on line B of FIG. 2, may be expressed mathematically as $$E_B=(1+\cos \omega_0 t)s(t) \tag{23}$$

where $$\omega_0=\frac{2\pi}{T_0} \tag{24}$$

and where $s(t)$ represents a square wave having a value of $\pm 1$ with all of the transitions occurring at zero times. As can be seen from FIG. 9A, $s(t)$ will have a $+$ value for a mark transition and a $-$ value for a space transition. Equation (23) does not contain a D.C. term which would be necessary to account for a D.C. error in the output of receiver 30. This is not significant since the operation of the synchronizing circuit is not effected by a D.C. potential at the output of receiver 30.

The voltages on lines H and E may be respectively written as $$E_H=\cos (\omega_0 t+\delta) \tag{25}$$

and $$E_E=\sin (\omega_0 t+\delta) \tag{26}$$

where $\delta$ represents the system phase error. If demodulators 32 and 38 are assumed to operate as multipliers in a manner similar to detectors 200 and 202 of the system of FIGS. 5 and 6, the outputs of demodulators 32 and 38 respectively are $$E_c=s(t)\cos (\omega_0 t+\delta)+\frac{s(t)}{2}[\cos (2\omega_0 t+\delta)+\cos \delta] \tag{27}$$

and $$E_D=s(t)\sin (\omega_0 t+\delta)+\frac{s(t)}{2}[\sin (2\omega_0 t+\delta)+\sin \delta] \tag{28}$$

Now, if it is further assumed that phase detector 42 provides at its output a signal equal to the D.C. or average value of the product of the two inputs thereto, its output may be defined $$\overline{E_C\times E_D}=\frac{\overline{s^2(t)}}{8}\sin 2\delta=\sin\frac{2\delta}{8} \tag{29}$$

Thus, oscillator 34 is phase-locked to the cos $\omega_0 t$ component of the message but with a polarity ambiguity since $\delta=0°$, 180° represents stable phase-lock conditions. It is to be further noted from Equation 29 that such lock is maintained regardless of the mark-space ($\pm$) switching of $s(t)$. The sine wave output on line E is depicted in FIG. 9B. As shown in this FIG., the zero crossover points of this wave occur at the center of each message bit interval of FIG. 9A and midway between the centers of bit intervals where the message voltage would normally be zero if proper D.C. restoration were made.

At this point, it is necessary to obtain a train of pulse samples of the output of receiver 30 respectively occurring at the centers of adjacent message bit intervals and at the points exactly midway between these centers. This is accomplished by first generating two pulse trains from the sine wave voltage on line E, one in which the pulses occur at the respective centers of adjacent bit intervals and one in which the pulses occur midway between these centers.

The latter pulse trains are generated in pulse generator 45. Pulse generator may suitably comprise means for producing pulses which occur at the zero crossover points of the wave shown in FIG. 9B. A suitable example of such a generator is a circuit 45*a* for converting the voltage on line E to a square wave, a circuit 45*b* for differentiating the output of circuit 45*a*, a diode 45*c* for passing the positive pulses from the differentiated output, a diode 45*d* for passing the negative pulses of the differentiated output and an inverter 45*e* for inverting the negative pulses from diode 45*d* to positive pulses.

The pulse trains resulting which may conveniently be designated as pulse trains A and B respectively are depicted in FIGS. 9C and 9D. It is seen that one of these pulse trains has pulses occurring at the center of each message bit interval of the message of FIG. 9A while the other pulse train has pulses occurring exactly midway between the centers of adjacent bit intervals. Thus, one of these pulse trains is to be utilized for sampling the message in order to determine mark-space information while the other pulse train is to be used to sample the zero voltage points of the message for the purpose of obtaining D.C. shift information. At this point, it cannot be ascertained which pulse train is which because of the ambiguity in the phase-lock of bit time oscillator 34.

The output of synchronous detector 30 on line B is simultaneously applied to a sampler 46 and a sampler 48, at the outputs of which there are obtained samplings of the output of synchronous detector 30 at the centers of bit intervals and at the zero voltage points of the message. A suitable circuit to be utilized in stages 46 and 48 is shown in FIG. 7.

Referring to FIG. 7, a triode 600 and comprising a cathode 602 connected to ground through an unbypassed resistor 604, a grid 606 and an anode 608 connected to a source of positive potential 601 through a resistor 610 is connected to provide two outputs of opposite phase.

One output is coupled from the anode 608 through a capacitor 612 to the junction of the anode of a diode 614 and a resistor 616, resistor 616 being connected to source 601. The other output of triode 600 is coupled from cathode 602 to the junction of the cathode of a diode 618 and a resistor 620, resistor 620 being connected to a source of negative potential 603. Diodes 614 and 618 are poled as shown and an input is applied to the junction 617 therebetween through a resistor 622.

In the operation of the circuit of FIG. 7, with the application of a positive pulse to grid 606, the positive pulse output from cathode 602 renders diode 618 non-conductive and the negative pulse output of anode 608 renders diode 614 non-conductive. Thus if simultaneously there is applied a signal through resistor 622, the output at point 623 will be a sampling of the signal for the duration that diodes 614 and 618 are at cutoff. With this arrangement there is provided in the circuit of FIG. 7, a circuit for sampling a signal having positive and negative portions.

Referring back to FIGS. 2 and 3, the outputs of samplers 46 and 48 are applied to pulse rectifiers 50 and 52 respectively whereby the pulses occuring at the outputs thereof are always positive regardless of the pulse polarity on lines O and N.

The outputs of rectifiers 50 and 52 are respectively applied to averaging circuits 54 and 56. Averaging circuits 54 and 56 may each comprise a long time constant low pass RC circuit. These averaging circuits provide at their respective outputs, unidirectional voltages substantially proportional to the summation over a finite time interval of the inputs thereto. Thus, the outputs of averaging circuits 54 and 56 respectively represent the time average of the magnitudes of the pulse samples of the output of synchronous detector receiver as obtained by sampling the receiver output with the A and B pulse trains. Since the message structure depicted in FIG. 9A is in the form of a blank followed by eight message bits followed by a mark followed by eight more message bits followed by a blank, etc., (i.e. each character is composed of eight message bits and the pulse interval between characters is alternately filled by either a blank or a mark), it is readily appreciated that the smaller of the two unidirectional voltages appearing respectively at the outputs of averaging circuits 54 and 56 represents samples taken at zero times in the message structure while the large of these two D.C. voltages represents samples taken at the center of each bit interval, i.e. at the center of each bit time. In other words, if there were no D.C. error in the output of synchronous detector receiver 30, sampling at zero times would yield a zero D.C. voltage at either the output of averaging circuit 54 or the output of averaging circuit 56 while sampling at bit times would yield a sizable D.C. voltage at one of the outputs of averaging circuits 54 or 56 regardless of the polarity of the message bits. Under the worst conditions, for example, when all marks are transmitted, there would still be a difference in D.C. voltage between the output of circuits 54 and 56 (depending upon which has applied thereto the samples at bit times) by virtue of the alternate character time blanks which are transmitted in accordance with the chosen message structure, viz., that of FIG. 9A.

Thus by comparing the D.C. voltages produced at the outputs of averaging circuits 54 and 56 respectively, an identification can be made as to whether pulse train A or pulse train B represents bit time or zero time samples respectively.

Such identification is made with D.C. voltage comparator 58. A suitable example of a D.C. comparator for identifying the desired voltage is depicted in FIG. 10.

In FIG. 10, the unidirectional potential outputs from averaging circuits 54 and 56 and appearing on lines F and L respectively are applied to the opposite ends of series connected relays 700 and 702. Shunting relays 700 and 702 are oppositely poled diodes 704 and 706, poled as shown.

In the operation of the circuit of FIG. 10, let it be assumed that the voltage on line F is the greater of the two unidirectional potentials. Thus net current flow will be in a downward direction through the relays. The reverse biasing of diode 704 will cause the current to flow through relay 700 and the forward biasing of diode 706 will short circuit relay 702. Thus only relay 700 will be energized in this situation causing the normally open contacts 708 and 712 associated therewith to close. It is seen, that by this arrangement the A pulse train is selected and thus bit time information is provided. Obviously, if the unidirectional potential on line L were the greater, the B pulse train would be selected to provide bit time information. Thus, contacts 708 and 710 together comprise selector 66.

The output of samplers 46 and 48 are also applied without rectification to averaging circuits 62 and 64 respectively. Averaging circuits 62 and 64 are long time constant low pass RC circuits similar to those of circuits 54 and 56. Since the ambiguity as to the identification of pulse train A and pulse train B has now been resolved by means of D.C. voltage comparison stage 58 and selector 66, selector 60 is actuated by a voltage such that the unidirectional voltage on line W at the output of selector 60 represents the D.C. voltage obtained from sampling the output of synchronous detector receiver 30 at zero times. Selector 60 may suitably be a circuit similar to that shown in FIG. 10 with the exception that the polarity of diodes 704 and 706 are reversed and an extra set of normally open contacts are provided for each relay. Thus in the situation of selector 60 with the switching of the biasing of the diodes as shown in FIG. 10 relay 702 instead of 700 is energized with the consequent closing of its contacts and the voltage to be selected from averaging circuits 62 and 64 would be the voltage from averaging circuit 64, assuming the situation where the voltage on line F is greater than the voltage on line L. This D.C. voltage on line W is then substantially equal to the D.C. error on line B which has resulted from the lack of D.C. restoration from the synchronous detector receiver 30. This D.C. correction voltage is now utilized in two ways as will be further described hereinbelow.

The output from samplers 46 and 48 on lines O and N respectively are carried to a selector 68. Selector 68 comprises collectively contacts 712 and 714 shown in the circuit of FIG. 10. Thus in the circuit of FIG. 10, wherein if the voltage on line F is the greater of the two voltages then with the energization of relay 700 thereby, contacts 712 close and thus the output of sampler 46 is selected by selector 68, and such output represents samples taken at the center of each message bit interval.

These samples are then compared in a mark-space decision circuit 70 to which there are applied the voltage selected by selector 60 and is the addition voltage of the average of the sampling of the output of synchronous detector receiver 30 at zero times, and the output of sampler 46 or 48 occurring at the center of message bit intervals. Mark-space decision circuit 70 may suitably be a resistive adder.

The output from mark-space decision circuit 70 is now applied to a sampler 72 together with the pulse train selected by selector 66. Sampler 72 is suitably a circuit similar to that of samplers 46 and 48 as depicted in FIG. 7 described hereinabove. In order to obtain sharp pulses, the output of sampler 72 may now be applied simultaneously to blocking oscillators 74 and 76 which respond respectively to positive and negative pulses and the outputs of blocking oscillators 74 and 76 are then combined to provide a pulse train on line U which faithfully represents samplings of the output of synchronous detector receiver 30 at the center of the message bit intervals which are D.C. corrected for any D.C. shift caused by receiver 30. This output on line U normally would provide satisfactory mark-space information except for the possibility of the polarity error on line B, i.e. the output of synchronous detector receiver 30, due to the ambiguity of the oscillator phase lock therein. Such ambiguity cannot be resolved until character time is established. The resolution of the latter ambiguity will be further explained hereinbelow.

The second use of the D.C. error voltage on line W is the D.C. restoration of the message voltage on line B by D.C. correction stage 78. The D.C. error voltage on line W and the message voltage on line B are combined in D.C. correction stage 78 to produce on line X a message voltage which is the same as that which appears on line B but with proper D.C. restoration. Thus the voltage on lines X and B are identical except that the voltage at X has been properly D.C. corrected so that its appearance will be that as shown in FIG. 9A.

The voltage on line X is passed through a full wave rectifier 80 so that the output voltage from rectifier 80 is always a series of 17 positive pulses with the message structure selected for the purpose of explanation followed by a blank regardless of the actual message sent. This voltage is shown in FIG. 9E and it is apparent that it is a periodic function having a fundamental frequency equal to one-half of the character time frequency.

Accordingly, a character time oscillator 86 is provided which provides a sinusoidal output at half the frequency of the character time, i.e. a train of waves having a period equal to twice the time of a single character or a period equal to the period of 18 message bits. The output of oscillator 86 together with the output of rectifier 80 is applied to a phase detector 88. Phase detector 88 and frequency control 90 together with character time oscillator 86 function similarly to the combination of bit time oscillator 34, frequency control 40 and phase detector 42 and character time oscillator 86 is phase-locked. At this point, it is to be noted that there is no ambiguity in this phase-lock since there is being mixed the output of the character time oscillator, against a known frequency component, which exists as part of the output of full wave rectifier 80. Thus the voltage appearing at the output character time oscillator 86 and its time registration is that shown in FIG. 9F. This voltage, as is seen, has zero crossings which occur at times which correspond to the center of the time intervals which separate the 8 bit characters. It now becomes necessary to provide character time pulses which occur at the zero crossover points of the output of character time oscillator 86.

Character time pulses as shown in FIG. 9G are generated in pulse generator 92. Pulse generator 92 may suitably comprise a squaring circuit and a differentiating circuit for differentiating the output thereof similar to the squaring circuit and differentiator of pulse generator 45. The output of pulse generator 92 may be receified in full wave rectifier 94 so that only positive pulses are provided at the zero crossover points of the output on line S and these pulses may be then utilized to generate a gate 96. Gate generator 96 may suitably be a one shot multivibrator and, in this situation, one which is switched from the stable to the astable state by a positive pulse input thereto. The output of gate generator 96 on line M is applied to and AND gate 98 together with the pulse train of the A and B pulse trains selected by selector 66. By this arrangement, every ninth bit-time pulse is gated out by gate 98 and identified as a character time pulse.

Upon to this point there has been derived a bit time output and a character time output and there remains only a possible polarity error, in the mark-space information on line U which has to be corrected. Such ambiguity is at this point readily resolved. It is seen that the negative-going zero crossings of the character time oscillator output as shown in FIG. 9F coincide with the alternate marks which are transmitted to separate alternate pairs of characters. Thus, if the positive pulses from the output of the differentiator in pulse generator 92 are clipped, only the negative pulses remain.

Accordingly, the output of pulse generator 92 is passed through a positive pulse clipper 100 and the negative pulse output therefrom is inverted in inverter 102 to provide positive pulses at the aforesaid negative-going zero crossings. These pulses are shown in FIG. 9H. The output from inverter 102 is applied to a sampler 104 together with the output from D.C. correction stage 78. Sampler 104 may suitably be a circuit such as samplers 46, 48 and 72. Obviously, the output of sampler 104 are sample pulses of the output of D.C. correction stage 78 which occur only at those times that the mark pulses which separate alternate pairs of characters occur. The output of sampler 104 is applied to an averaging circuit similar to circuits 54, 56, 62 and 64 and a unidirectional voltage is thus provided at the output of averaging circuit 106. Since the pulses from inverter 102 occur only when known marks are transmitted, the unidirectional voltage output of averaging circuit 106 can be negative only if a polarity error exists in the output of synchronous detection receiver 30. Thus the voltage at the output of averaging circuit 106, if it is negative, is utilized to reverse the polarity of the combined voltage output of blocking oscillators 74 and 76 on line U or if it is positive to leave such output unchanged. Such polarity control is depicted by stage 108 and a circuit useful therefor is shown in FIG. 8. Thus, at the output of polarity control stage 108 there is provided the correct mark-space information.

Referring now to FIG. 8, there is shown a phase inverter 810 to which the voltage on line U is applied and a relay coil 800 to which is applied the voltage on line Y, i.e., the output of averaging circuit 106. Associated with relay coil 800 are contacts 802, 804, and 806, contacts 804 and 806 normally assuming the closed position. Shunting relay coil 800 is a diode 808 poled as shown.

It is seen that if the voltage on line Y is positive, coil 800 is short-circuited to ground by diode 808 and remains unenergized. The output is therefore from the cathode 813 of tube 812 and is in phase with the input on line U. However, if the voltage on line Y is negative, diode 808 becomes reversed biased and relay coil 800 is energized. Consequently contacts 802 and 804 are caused to close and the output is taken from plate 814 which is the reverse of the phase of the input on line U. Thus, the output of polarity stage 108 is a series of pulses which contain the correct mark-space information and provide the mark-space output for the system.

To summarize the above description of the operation of the system of this invention, it can be described as the deriving of pulse trains A and B without regard to either polarity error or D.C. error at the output of synchronous detector receiver 30. Pulse trains A and B are then properly identified by comparison of the D.C. voltages which exist at the outputs of averaging circuits 54 and 56. The D.C. error at the output of synchronous detector receiver 30 is then resolved by the selection of a correction voltage from either of the outputs of averaging circuit 62 or averaging circuit 64. With the ambiguity of the pulse trains A and B resolved, and with the D.C. error information at the output of synchronous detector receiver 30 made available, mark-space decisions are then made which are correct except for a possible polarity ambiguity. Character time is then established after D.C. correction of the signal at the output of the synchronous detector receiver 30 and the ambiguity of the mark-space voltage on line U is resolved.

The system of this invention is completely automatic, requires no resolution by an operator of possible ambiguities and permits complete freedom of message selection. In other words, proper system operation is assured without requiring special message content such as a nearly equal percentage of marks and spaces over a certain period of time.

It is understood that the message structure shown in FIG. 9A is not mandatory. The character shown therein which is composed of eight bits has been selected for convenience of description in operation and explanation of the invention and it is to be understood a character composed of a greater or smaller number of bits than the eight shown in FIG. 9A may be used. Similarly, as to time for bit duration, this may also be selected depending on the design requirements of the system. For example, a system having bit durations of 0.5 ms. requires a base-band frequency of about 3 kc. Obviously, the bit duration can be varied depending upon the channel capacity desired or the transmission conditions which are expected. With the message structure shown in FIG. 9A and with 0.5 ms. bits, the system of this invention has a capacity of roughly 1,780 bits per second. If properly used, this permits the operation of about 60 teletype machines operating at 60 words per minute.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed and desired to be secured by Letters Patent of the United States is:

1. In a radio Teletype system wherein there is utilized a transmitted wave whose phase is shifted by 180° during a mark-space transition, the wave effectively being a suppressed carrier amplitude modulated signal modulated by a message signal comprising bits which are positive and negative pulses, each of the bits having equal widths, a chosen number of bits comprising a single character, an interval of bit width between successive characters, one set of alternate intervals being blanks, the other set of alternate intervals containing a bit pulse of a chosen polarity; a receiver in said system for providing character time information comprising phase locking synchronous detecting means for demodulating said transmitted wave and for phase-locking the detected message signal with the phase of the carrier contained in the sidebands of the transmitted suppressed carrier signal, means for applying said transmitted modulated wave to said synchronous detecting means, means for generating a signal for a period equal to the sum of two characters and two interval periods, means for phase-locking said generated signal with the phase of said detected message signal, means for applying said generated signal and said phase-locked detected signal to said last named phase-locking means and means responsive to the application thereto of said phase-locked signal for generating a pulse train comprising pulses occurring at the zero crossover points of said generated signal.

2. In a radio Teletype system wherein there is utilized a transmitted wave whose phase is shifted by 180° during a mark-space transition, the wave effectively being a suppressed carrier amplitude modulated signal modulated by a message signal comprising bits which are positive and negative pulses, each of the bits having equal widths, a chosen number of bits comprising a single character, an interval of bit width between successive characters, one set of alternate intervals being blanks, the other set of alternate internate intervals containing a bit pulse of a chosen polarity; a receiver in said system for providing character time information comprising phase locking synchronous detecting means for demodulating the transmitted wave and for phase-locking the detected message signal with the phase of the carrier contained in the sidebands of the transmitted suppressed carrier signal, means for applying said transmitted modulated wave to said synchronous detecting means, in circuit with means for rectifying the output of said synchronous detecting means, means for generating a signal having a period equal to the sum of the periods of two characters and two interval periods, means for phase-locking the phase of said generated signal with the phase of said rectified output of said synchronous detecting means, means for applying said generated signal and said phase-locked detected signal to said last named phase-locking means and means responsive to the application thereto of said phase-locked generated signal for generating a pulse train comprising pulses occurring at the zero crossover points of said generated signal.

3. In a radio Teletype system wherein there is utilized a transmitted wave whose phase is shifted by 180° during a mark-space transition, the wave effectively being a suppressed carrier amplitude modulated by a message signal comprising bits having equal widths, a receiver in said system for providing character time information comprising phase locking synchronous detecting means responsive to the application of said transmitted wave for demodulating said carrier transmitted wave and for phase locking the detected message signal with the phase of the transmitted wave, means responsive to the application thereto of said detected message signal for generating a first signal having the frequency of the detected message signal and for phase locking said first signal with the phase of said detected signal, means for generating first and second pulse trains in response to the application thereto of said first phase locked signal, the pulses of one of said trains occurring substantially at the respective centers of said bits of said detected message signal, the pulses of the other of said trains occurring substantially at the respective points between adjacent bits of said detected message signal, first sampling means for sampling the output of said detecting means with said first pulse train, second sampling means for sampling the output of said detecting means with said second pulse train, means coupled to the output of said first sampling means for deriving a first substantially unidirectional potential which is proportional to the average, regardless of polarity, of the said output of said first sampling means, means coupled to the output of said second sampling means for deriving a second substantially unidirectional potential, which is proportional to the average, regardless of polarity, of the output of said second sampling means, means in circuit with both of said sampling means for comparing said first and second potentials, first selecting means responsive to the greater of said first and second potentials for selecting the output of the sampling means of said first and second sampling means whose pulses occur at the center of the bits of said detected message signal, means in circuit with said first sampling means for deriving a third substantially unidirectional potential which is proportional to the average of the output of said first sampling means, means in circuit with said second sampling means for deriving a fourth substantially unidirectional potential which is proportional to the average of the output of said second sampling means, second selecting means responsive to the one of said third and fourth potentials which is derived from the output of the sampling means whose samples occur between message signal bits, D.C. correction means for adding said one of said third and fourth potentials selected by said second selecting means to the output of said synchronous detecting means, means for generating a second signal having a period equal to the sum of two character periods, means responsive to the application thereto of said second signal and the output of said D.C. correction means for phase locking the phase of said second signal with the phase of the output of said D.C. correction means and means responsive to the application thereto of said phase locked second signal for generating a third pulse train comprising pulses at the zero crossover points of said second signal.

4. In a radio Teletype system wherein there is utilized a transmitted wave whose phase is shifted by 180° during a mark-space transition, the wave effectively being a suppressed carrier amplitude modulated by a message signal comprising bits having equal widths, a chosen number of bits comprising a single character, a receiver in said system for providing character time information comprising phase locking synchronous detecting means responsive to the application of said transmitted modulated wave for demodulating said wave and for phase locking the detected message signal with the phase of the transmitted wave, means for generating a first signal having the frequency of the detected message signal and for phase locking said first signal with the phase of said detected signal, means for applying said detected message signal to said last named generating means, means for generating first and second pulse trains in response to the application thereto of said first phase locked signal, the pulses of one of said trains occurring substantially at the respective centers of said bits of said detected message signal, the pulses of the other of said trains occurring substantially at the respective points between adjacent bits of said detected message signal, first sampling means for sampling the output of said detecting means with said first pulse train, second sampling means for sampling the output of said detecting means with said second pulse train, means for rectifying the output of said first sampling means, means for rectifying the output of said second sampling means, means for deriving a first substantially unidirectional potential which is proportional to the average of the rectified output of said first sampling means, means for deriving a second substantially unidirectional potential which is proportional to the average of the rectified output of said second sampling means, means responsive to the application thereto of said first and second potentials for comparing said first and second potentials, first selecting means responsive to the greater of said first and second potentials for selecting the output of the sampling means of said first and second sampling means whose pulses occur at the centers of the message bits of said detected message signal, means for deriving a third substantially unidirectional potential which is proportional to the average of the output of said first sampling means, means for deriving a fourth substantially unidirectional potential which is proportional to the average of the output of said second sampling means, second selecting means responsive to the one of said third and fourth potentials which is derived from the output of the sampling means whose samples occur between message signal bits, D.C. correction means coupled to the output of said second selecting means for adding said one of said third and fourth potentials selected by said second selecting means to the output of said synchronous detecting means, means for rectifying the output of said D.C. correction means, means for generating a second signal having a period equal to the sum of two characters and two interval periods, means responsive to the application thereto of said second signal and said rectified output of said D.C. correction means for phase locking the phase of said second signal with the phase of said rectified output and means responsive to the application thereto of said phase locked second signal for generating a third pulse train comprising pulses occurring at the zero crossover points of said second signal.

5. In a system wherein there is utilized a suppressed carrier amplitude modulated signal modulated by a message signal comprising successively occurring characters, each of said characters having a chosen period; means for providing the times of character occurrences comprising phase locked synchronous detecting means responsive to the application thereto of the suppressed carrier wave for detecting the message signal therefrom and for phase-locking with said detected signal with the carrier phase information contained in the sidebands of the transmitted suppressed carrier signal, means for applying said modulated suppressed carrier signal to said detecting means, means for generating a signal, each cycle of which has a period equal to two character periods, means for phase-locking said generated signal with said phase-locked detected signal, means for applying said generated signal and said phase-locked detected signal to said last named phase-locking means, and means responsive to the application thereto of said phase-locked generated signal for producing a pulse train, each of said pulses being separated by a period equal to a character period.

6. In a system wherein there is utilized a suppressed carrier amplitude modulated signal modulated by a message signal comprising bits which are positive and negative pulses, a chosen number of bits comprising a character; a receiver in said system for providing the times of character occurrences comprising phase locking synchronous detecting means for detecting the message signal from said said suppressed carrier signal and for phase-locking said detected message signal with the sideband carrier of the transmitted suppressed carrier signal, means for applying said modulated suppressed carrier signal as an input to said detecting means, means for generating a signal, each cycle of which has a period equal to the sum of the period of two characters, means for phase-locking said generated signal with said phase-locked detected signal, means for applying said phase-locked detected signal and said generated signals to said last named phase-locking means, and means responsive to the application thereto of said phase-locked generated signal for producing a pulse train comprising pulses occurring at the zero crossover points of said phase-locked generated signal.

7. In a radio Teletype system wherein there is utilized a transmitted wave whose phase is shifted by 180° during a mark-space transition, the wave effectively being a suppressed carrier amplitude modulated signal modulated by a message signal comprising successively occurring characters, each of the characters comprising a chosen number of bits of equal width; a receiver in said system for providing character time information comprising phase locking synchronous detecting means for demodulating the suppressed carrier wave and for phase-locking the detected message signal with the sidebands of the transmitted suppressed carrier wave, means for applying said modulated suppressed carrier wave to said synchronous detecting means, means for generating a wave, each cycle of which has a period equal to the sum of two character periods, means for rectifying said phase-locked message signal, means for applying said phase-locked signal to said rectifying means, means for phase-locking said generated signal with said phase-locked rectified message signal, means for applying said phase-locked rectified signal and said generated signal to said last named phase-locking means, and means responsive to the application thereto of said phase-locked generated signal to produce a pulse train comprising pulses occurring at the zero crossover points of said phase-locked generated signal.

8. In the system defined in claim 4 and further including gate generating means responsive to the application thereto of said third pulse train for providing a signal having a period equal to the period of a character, and means responsive to the simultaneous application thereto of the output of said gate generating means and said pulse train selected by said first selecting means for providing pulses occurring at the beginnings respectively of each character.

No references cited.